United States Patent [19]
Tracy et al.

[11] Patent Number: 5,807,533
[45] Date of Patent: Sep. 15, 1998

[54] METHOD FOR CHARGING A HYDROGEN GETTER

[75] Inventors: C. Edwin Tracy, Golden; Matthew A. Keyser, Westminster; David K. Benson, Golden, all of Colo.

[73] Assignee: Midwest Research Institute, Kansas City, Mo.

[21] Appl. No.: 772,484

[22] Filed: Dec. 23, 1996

[51] Int. Cl.$^6$ ........................................ C01B 6/24
[52] U.S. Cl. ........................... 423/644; 420/900
[58] Field of Search ................. 423/644; 420/900

[56] References Cited

U.S. PATENT DOCUMENTS

| | | | |
|---|---|---|---|
| 4,269,624 | 5/1981 | Figini | 75/177 |
| 4,300,946 | 11/1981 | Simons | 423/644 |
| 4,312,669 | 1/1982 | Boffito et al. | 75/177 |
| 4,360,445 | 11/1982 | Mendelsohn et al. | 252/181.6 |
| 4,537,761 | 8/1985 | Reed et al. | 423/644 |
| 4,661,415 | 4/1987 | Ebato et al. | 428/570 |
| 4,839,085 | 6/1989 | Sandrock et al. | 252/181.6 |
| 4,996,002 | 2/1991 | Sandrock et al. | 252/181.6 |
| 5,149,383 | 9/1992 | Seri et al. | 148/400 |
| 5,268,143 | 12/1993 | Gamo et al. | 420/422 |
| 5,281,390 | 1/1994 | Gamo et al. | 420/422 |
| 5,318,108 | 6/1994 | Benson et al. | 165/96 |

FOREIGN PATENT DOCUMENTS

| | | | |
|---|---|---|---|
| 355207 | 2/1990 | European Pat. Off. | 420/900 |
| 136957 | 10/1981 | Japan | 420/900 |

OTHER PUBLICATIONS

"'Gettering' an Integral Part of Vacuum Technology," Dr. Paolo della Porta, *American Vacuum Society*, Technical Paper TP 202, presented at American Vacuum Society 39th National Symposium, Nov. 9–13, 1992.

"Nonevaporable gettering technology for in–situ vacuum processes," R. Heyder, L. Watson, R. Jackson, G. Krueger, A. Conte, *Solid State Technology*, 71–75 (Aug. 1996).

"St 707™ Non–evaporable Getter Activatable at Low Temperatures," SAES Getters brochure, SAES Getters S.p.A., Head Office: Via Gallarate, 215, 20151 Milano, Italy.

*Primary Examiner*—Wayne Langel
*Attorney, Agent, or Firm*—Ken Richardson

[57] ABSTRACT

A method for charging a sample of either a permanent or reversible getter material with a high concentration of hydrogen while maintaining a base pressure below $10^{-4}$ torr at room temperature involves placing the sample of hydrogen getter material in a chamber, activating the sample of hydrogen getter material, overcharging the sample of getter material through conventional charging techniques to a high concentration of hydrogen, and then subjecting the sample of getter material to a low temperature vacuum bake-out process. Application of the method results in a reversible hydrogen getter which is highly charged to maximum capacities of hydrogen and which concurrently exhibits minimum hydrogen vapor pressures at room temperatures.

46 Claims, 9 Drawing Sheets

METHOD FOR CHARGING A HYDROGEN GETTER

CONTRACTUAL ORIGIN OF THE INVENTION

The United States Government has rights in this invention under Contract No. DE-AC3683CH10093 between the U.S. Department of Energy and the National Renewable Energy Laboratory, a Division of Midwest Research Institute.

BACKGROUND OF THE INVENTION

1. Field of the Invention

This invention relates generally to a method for charging a hydrogen ($H_2$) getter material and, more particularly, to a method for increasing useful ranges of hydrogen pressures provided by hydrogen ($H_2$) getter materials by overcharging the hydrogen getter materials and then selectively removing more loosely bonded portions of the hydrogen ($H_2$).

2. Description of the Prior Art

Getter materials are used in evacuated spaces for removing gas by sorption. Sorption refers to the taking up of gas (or vapor) by absorption, adsorption, chemisorption, or any combination of these processes. Absorption and adsorption are physical processes. Chemisorption refers to the binding of gas (or vapor) on the surface or in the interior of a solid (or liquid) by chemical action.

Many reactive metals, such as, for example, barium, titanium, and zirconium, can rapidly pump (absorb) large quantities of active, non-inert, gases because they getter or react with the gases. Getter materials are often employed in vacuum environments to trap gaseous impurities such as, for example, hydrogen, nitrogen, oxygen, carbon dioxide, carbon monoxide, and water vapor, and to maintain a low-pressure in a sealed vacuum enclosure. In fact, any permanently sealed-off vacuum device such as, for example, a lamp, electronic tube, thermos bottle, etc., in which the pressure remains essentially constant requires a chemically active getter material to be placed within the sealed-off vacuum device to sorb excess or residual gases so that the low-pressure vacuum can be maintained. The getter materials eliminate active gases in the sealed-off vacuum by chemically binding the gaseous molecules to the getter material Getter materials can be evaporable, non-evaporable, permanent, or reversible. Typically getter materials are permanent with respect to some gases and reversible with respect to others, as will be explained in more detail below. Evaporable getter materials are getter materials such as, for example, barium and titanium, that are activated by evaporation within a vacuum chamber environment to cover the inside surfaces of the vacuum chamber and to enable absorption of gases by the getter material. Evaporable getters are primarily used in sealed environments, such as vacuum tubes and cathode ray tubes, to provide passive, chemically based pumping (sorption) of gases. Non-evaporable or "bulk" getter materials are getter materials, such as, for example, zirconium alloys, that are capable of dissolving and adsorbing their own oxides in the solid state at elevated temperatures, thereby exposing a fresh metal surface for renewed chemical reaction and creating a clean, renewable, and highly reactive metal surface which will enable the getter material to absorb gas.

A permanent getter material is a getter material that sorbs gases and, once sorbed, the gases cannot be released or desorbed. A reversible getter material is a material that can release gas previously absorbed into the reversible getter material. Some getter materials act as permanent getters for some gases and reversible getters for other gases. For example, zirconium-vanadium-iron alloys can act as permanent getters to permanently sorb and trap gases such as nitrogen, oxygen, carbon dioxide, and carbon monoxide and to reversibly absorb hydrogen gas. Such a getter material, therefore, will sorb hydrogen, nitrogen, oxygen, carbon dioxide, carbon monoxide, etc., but will only desorb or release the hydrogen. Therefore, in many cases, a reversible getter material for hydrogen is also a permanent getter material for other gases. A reversible getter material will absorb gases during certain conditions, such as when the reversible getter material is cooled, and release gases during other conditions, such as when the reversible getter material is heated. For purposes of the present invention, a reversible hydrogen getter material is defined as a getter material that acts as a reversible source for hydrogen (i.e., the getter material will sorb and desorb hydrogen) but which may also act as a permanent getter material for other gases (i.e., the getter material will permanently sorb and trap gases other than hydrogen).

Reversible getter materials have been used in the vacuum industry for many years to permanently absorb active gases such as carbon dioxide, carbon monoxide, and water vapor and reversibly absorb hydrogen. In a typical example, a reversible hydrogen getter material is heated to release the hydrogen gas contained within the reversible hydrogen getter material or the reversible hydrogen getter material is cooled so that it absorbs hydrogen gas in the space (usually a enclosed space) surrounding the reversible hydrogen getter material. In U.S. Pat. No. 5,318,108 issued to Benson et al., a reversible hydrogen getter that absorbs hydrogen gas at cooler temperatures and releases hydrogen gas at higher temperatures is used to selectively release hydrogen gas into, or withdraw hydrogen gas from, an enclosed vacuum insulation chamber in order to increase or decrease heat transfer across an enclosed chamber so as to control the insulative effects of the chamber. The release of the hydrogen gas by the getter material increases the amount of hydrogen gas within the enclosed chamber, thereby decreasing the vacuum within the enclosed chamber by increasing the gas pressure within the enclosed chamber, which increases heat transfer across the chamber by molecular conduction. In contrast, absorption of the hydrogen gas by the getter material decreases the amount of hydrogen gas within the chamber, thereby increasing the vacuum within the enclosed chamber by decreasing the gas pressure within the enclosed chamber, which decreases heat transfer by molecular conduction.

In other typical uses of getter materials in a vacuum or other evacuated chamber or enclosed space, the vacuum chamber is pumped down to an extremely low pressure by, for example, a mechanical vacuum pump or a diffusion pump. After the vacuum chamber is pumped down to the low pressure, the vacuum chamber is further degassed by baking or heating the vacuum chamber such that residual gas molecules occluded in the vacuum chamber or otherwise trapped within the vacuum chamber or adhered to the walls of the vacuum chamber are released. During the degassing process, the residual gases are evacuated or exhausted from the walls of the vacuum chamber, thereby lowering the pressure within the vacuum chamber and increasing the vacuum of the vacuum chamber. The vacuum chamber will continue to outgas, however, even after the degassing process. That is, additional occluded and absorbed residual gases in the vacuum chamber walls and molecules that are released by the chamber walls or by other materials within the chamber will continue to be released into the evacuated space enclosed by the vacuum chamber walls, thereby increasing the gas pressure within the vacuum chamber and decreasing the vacuum of the vacuum chamber. However, getter materials located within the vacuum chamber sorb, thus effectively remove the continuously released residual molecules so that the pressure within the vacuum chamber does not increase. In addition, as previously discussed above, some reversible getter materials will release hydrogen upon heating of the reversible getter materials, thereby allowing the absorption and release of gas within the vacuum chamber to be controlled by selective heating and cooling of the getter materials and providing some control over the pressure maintained within the vacuum chamber.

One way to determine the hydrogen gettering or sorption capacity of a sample of reversible getter material is by its torr-liters per gram (torr-liters/gram) characteristic, which is generally a measure of the amount of $H_2$ that a getter can hold and release. More specifically, it is a measure of the $H_2$ concentration of the sample of getter material after the sample of getter material is charged (i.e., after the sample of getter material has absorbed hydrogen). Therefore, the charge of a sample of getter material is a measure of how much hydrogen is absorbed by the getter material. For example, in an ideal situation, if an enclosed chamber has a volume of twenty-five liters and the pressure within the enclosed chamber is very small (i.e., less than $10^{-4}$ torr), and if a pressure of twenty torr is desired within the enclosed chamber, a twenty-five gram sample of reversible hydrogen getter material will need to have a twenty torr-liters per gram characteristic since:

$$20\text{torr} \times 25\text{liters} = 20\text{torr-liters/gram} \times 25\text{grams} \qquad (1)$$

and which allow the twenty-five gram sample of reversible hydrogen getter material to release twenty torr-liters of hydrogen per gram to increase the pressure within the chamber to twenty torr. Alternatively, a five gram sample of reversible hydrogen getter material in the same enclosed chamber will need to have a one-hundred torr-liters per gram characteristic since:

$$20\text{torr} \times 25\text{liters} = 100\text{torr-liters/gram} \times 5\text{grams} \qquad (2)$$

since the five gram sample of reversible hydrogen getter material will need to release one-hundred torr-liters of hydrogen per gram to raise the pressure within the chamber to twenty torr.

In a more specific example, suppose that a twenty-six liter enclosed volume at extremely low pressure (i.e., less than $10^{-4}$ torr) is used and the desired pressure within the enclosed volume is twenty torr. The reversible hydrogen getter material to be used is an St707™ alloy manufactured by SAES Getters, S.p.A. of Milano, Italy, which comprises zirconium, vanadium, and iron (Zr, V, Fe) at a weight composition of 70%, 24.6%, and 5.4%, respectively. The zirconium-vanadium-iron alloy permanently absorbs certain gases such as $H_2O$, $O_2$, $N_2$, $CO_2$, and CO and reversibly absorbs and desorbs $H_2$. If the zirconium-vanadium-iron alloy getter sample has an $H_2$ concentration of twenty-five torr-liter/gram, then 20.8 grams of the getter material will be needed to be able to desorb enough $H_2$ into the enclosed volume to produce the desired pressure of twenty torr in the enclosed volume. If the zirconium-vanadium-iron alloy getter sample has an $H_2$ concentration of fifty torr-liter/gram, then 10.4 grams of the getter material will be needed. If the zirconium-vanadium-iron alloy getter sample has a hydrogen ($H_2$) concentration of one-hundred torr-liter/gram, then 5.2 grams of the getter material will be needed. As shown by both examples of the zirconium-vanadium-iron alloy, a reversible getter sample having a larger torr-liter/gram characteristic will enable the getter sample used to meet the desired performance characteristics (i.e., resulting chamber pressure) to be smaller than a getter sample that has a smaller torr-liter/gram characteristic.

Being able to reduce the required amount of the getter material and still provide a sufficient amount of desorbed $H_2$ has several direct benefits. For example, since a smaller amount of getter material is required, the cost of the getter material is generally reduced. Also, vacuum chambers are often fairly small and are sometimes narrow or of odd shapes, so the ability to use smaller amounts of getter that fit into the chamber has advantages. In addition, because the getter material is often placed in a canister, a smaller canister can be used to hold the getter material, thereby reducing the cost of the canister. Furthermore, since the getter material is typically heated by an electrically resistive heater element to release the hydrogen absorbed from the getter material and a larger getter sample size requires more electric power to heat the getter sample, a reduction in the size of the getter sample reduces the electric power required to heat the getter sample when the hydrogen is to be released from the getter sample.

In the four examples of reversible hydrogen getter materials discussed above, an ideal reversible hydrogen getter material was used. A reversible hydrogen getter material is deemed to be "ideal" if it is able to release all of the hydrogen stored or concentrated in the getter material. In most cases, a reversible hydrogen getter material, when heated in an enclosed chamber of fixed volume, may only be able to release between eighty and ninety percent of the hydrogen gas concentrated in the reversible hydrogen getter material. Therefore, a higher torr-liter/gram characteristic may be needed by the sample of reversible hydrogen getter material used to insure that the sample of reversible hydrogen getter material will be able to release a sufficient amount of hydrogen into the enclosed volume to raise the pressure within the enclosed volume to the desired level. For purposes of discussing prior art getters as well as the present invention, the charge level of a sample of reversible hydrogen getter material is considered to be the total amount of hydrogen that the sample of reversible hydrogen getter material absorbs, and the amount of hydrogen that the reversible hydrogen getter material can reversibly absorb will be approximately ten to twenty percent less.

Conventional $H_2$ charging of a hydrogen getter material, such as St707™ alloy, is generally a two step process. First, the getter material is activated to eliminate a protective oxide film on the surface of the getter material which will enable the getter material to begin absorbing hydrogen. For example, heating the getter material under vacuum for a short time (e.g., $10^{-6}$ torr, 800° C., ten minutes) activates the getter material and causes the initial oxide film on the surface of the getter material to diffuse into the bulk of the getter material, thereby leaving the surface of the getter material available for sorption. Exposing the getter material to lower temperatures for a longer period of time can also activate the getter material. Second, after the getter material is activated, it is then exposed to $H_2$ and allowed to absorb a charge of $H_2$. Charging of the getter material beyond twenty torr-liter/gram is generally not recommended due to hydride formation and the resultant deviation from the normal theoretical behavior of the getter alloys, which is approximated by the Sieverts' equation:

$$\log P = A + 2 \log Q - \frac{B}{T} \tag{3}$$

where P equals the $H_2$ equilibrium pressure in torr, Q equals the $H_2$ concentration within the alloy (torr-liter/gram), T equals the temperature [in degrees Kelvin (°K)], and A and B are constants. For an St707™ alloy, A is equal to approximately 4.8 and B is equal to approximately 6,116. Essentially, the Sieverts' equation provides the relationship between the $H_2$ gas pressure over a getter material and the amount of $H_2$ dissolved in the getter material at different temperatures.

When the getter material is overcharged with conventional techniques to a level above approximately ten to twenty torr-liters/gram, the Sieverts' equation no longer provides a realistic model of the hydrogen equilibrium pressure of the getter material. More specifically, a getter material overcharged with conventional techniques above ten to twenty torr-liters/gram will have a relatively flat hydrogen equilibrium pressure curve at low temperatures compared to a steeper curve at higher temperatures such that the getter material has a relatively constant base pressure at low temperatures compared to higher temperatures. For example, a 1.14 gram sample of reversible hydrogen getter material comprising titanium and hydrogen ($TiH_2$) was overcharged using conventional techniques to 150 torr-liters/gram of hydrogen. Below approximately 200° C., the resulting overcharged getter material had a hydrogen equilibrium pressure or base pressure between 0.1 and 0.01 torr. Unfortunately, the Sieverts' equation predicts a base hydrogen pressure below $10^{-6}$ torr at temperatures below approximately 200° C. for the 150 gram sample of hydrogen getter material overcharged to 114 torr-liters/gram. Therefore, the Sieverts' equation erroneously predicts base hydrogen pressures at low temperatures when the getter material is overcharged above ten to twenty torr-liters per gram using conventional techniques.

The relatively constant base pressure at low temperatures of an overcharged reversible getter material can limit the use of the reversible getter material in vacuum insulation applications, such as in the variable conductance vacuum insulation panel disclosed in U.S. Pat. No. 5,318,108 issued to Benson et al., particularly if the base pressure is too high. For example, in Benson et al., the equilibrium pressure within the chamber of the vacuum insulation panel is evacuated and heat transfer across the panel is controlled by controlling the gas pressure within the chamber by heating and cooling a metal hydride getter to selectively release and reabsorb hydrogen gas ($H_2$) into and from the chamber. Heat transfer or conductance across the panel is facilitated by molecular conduction when the gas pressure within the vacuum chamber is increased to $10^{-4}$ torr by heating the metal hydride getter. Alternatively, heat transfer or conductance across the panel by molecular conduction is inhibited when the gas pressure within the vacuum chamber is decreased to below $10^{-4}$ torr by cooling the metal hydride getter. In order to maximize the benefits obtained by using the variable conductance vacuum insulation disclosed in Benson et al., therefore, the getter material or metal hydride used must be able to have a hydrogen equilibrium pressure below $10^{-4}$ torr. A titanium hydrogen ($TiH_2$) getter material overcharged to 150 torr-liter/gram according to conventional charging procedures as discussed above, therefore, would be unsuitable for use in the variable conductance vacuum insulation disclosed in Benson et al. since it cannot have an base pressure at low temperatures below approximately 0.01 torr.

As the previous examples show, while an overcharged hydrogen getter material may reduce the amount of getter material needed in certain applications, the resulting getter material may have a base pressure that is too high for the intended application. Thus, despite the conventional techniques for charging a hydrogen getter material, there remains a need for a method for overcharging a hydrogen getter material beyond the standard ten to twenty torr-liters/gram range that results in a highly charged getter material having a base pressure at low temperature below $10^{-4}$ torr.

SUMMARY OF THE INVENTION

Accordingly, it is a general object of this invention to provide a method for highly charging a hydrogen getter material.

A more specific object of this invention is to provide a method for charging a hydrogen getter material beyond twenty torr-liters/gram.

Another specific object of this invention is to provide a method for highly charging a hydrogen getter material that has a base pressure that does not become relatively constant at above $10^{-4}$ torr low temperatures.

Another general object of this invention is to provide a method of charging a hydrogen getter material such that the getter material has a maximum capacity of hydrogen while concurrently displaying minimum hydrogen base pressures at low temperatures.

Another specific object of this invention is to provide a method for charging a hydrogen getter material that has a base pressure below $10^{-\infty}$ torr at low temperatures.

Additional objects, advantages, and novel features of the invention shall be set forth in part in the description that follows, and in part will become apparent to those skilled in the art upon examination of the following or may be learned by the practice of the invention. The objects and the advantages may be realized and attained by means of the instrumentalities and in combinations particularly pointed out in the appended claims.

To achieve the foregoing and other objects and in accordance with the purposes of the present invention, as embodied and broadly described herein, the present invention comprises a method of highly charging a sample of getter material while maintaining a low residual equilibrium base pressure at low temperatures, by overcharging the sample of getter material beyond ten to twenty torr-liters/gram and then subjecting the sample of getter material to a vacuum bake-out process.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention.

In the Drawings

DETAILED DESCRIPTION OF THE PREFERRED EMBODIMENTS

Figure 1:
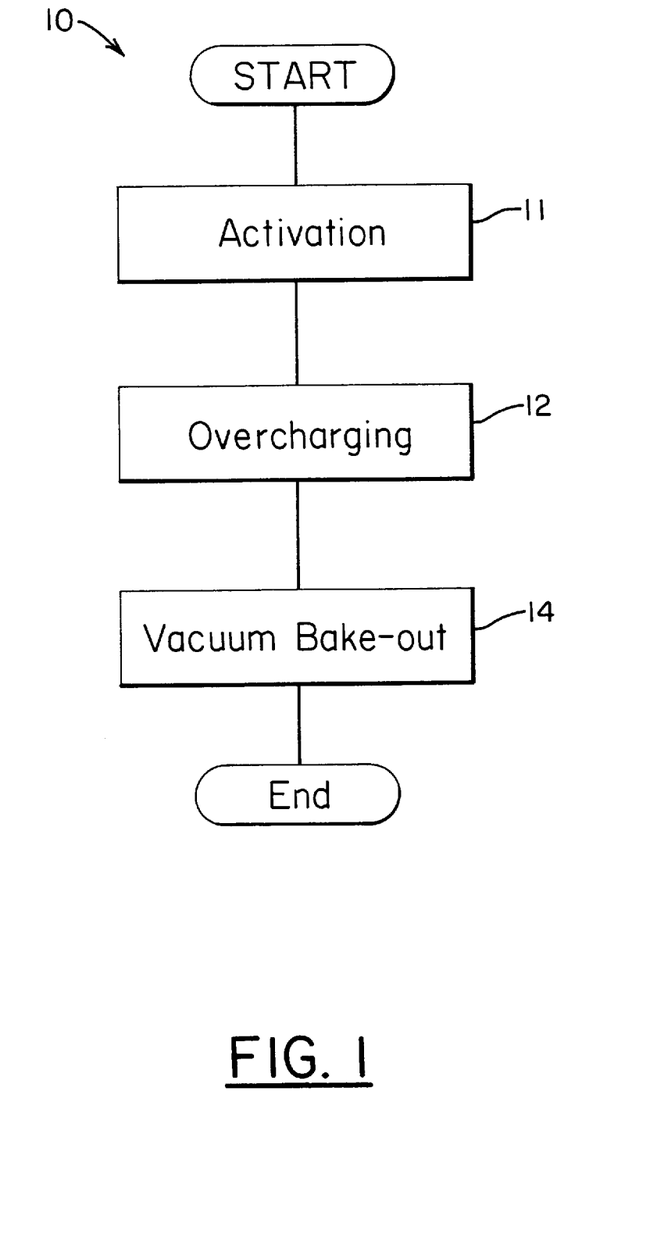
FIG. 1 is a block diagram illustrating the method of the present invention.

The method 10 of the present invention for charging a hydrogen ($H_2$) getter is illustrated in a simplified block diagram form in FIG. 1 and essentially comprises an activation step 11, wherein a sample of hydrogen getter material is activated in an enclosed chamber using conventional activation techniques and methods, such as, for example, heating the sample of getter material, to remove the oxide layer on the outside surface of the sample of hydrogen getter material. The activation step 11 is followed by an overcharging step 12 wherein the activated sample of hydrogen getter material within the chamber (not shown) is overcharged (i.e., charged to more than twenty torr-liters/gram of hydrogen) with hydrogen by exposing the sample of hydrogen getter material to hydrogen such that the sample of hydrogen getter material absorbs the hydrogen and develops a high hydrogen concentration. After the overcharging step 12, the sample of overcharged hydrogen getter material is subjected to a vacuum bake-out step 14, wherein heat is applied to the sample of overcharged hydrogen getter material (or the sample of hydrogen getter material is otherwise heated), while the chamber is preferably being evacuated of gases, so as to remove the deleterious high residual hydrogen base pressure of the sample of hydrogen getter material created at the end of the overcharging step 12, as will be discussed in more detail below. The resultant hydrogen getter material is highly charged, i.e., the hydrogen getter material is overcharged to more than twenty torr-liters/gram of hydrogen while having a base pressure below approximately $10^{-4}$ torr at low temperatures. More specific examples of getter materials created using the method of the present invention will be provided below. The getter materials for which the method of the present invention can apply include evaporable getter materials such as barium and titanium, non-evaporable getter materials such as zirconium alloys, permanent getter materials, and reversible getter materials (including getter materials that are permanent with respect to some gases but reversible with respect to other gases).

The method of the present invention will now be described in more detail and in relation to conventional getter charging techniques, using an zirconium-vanadium-iron alloy (such as an St707™ alloy) as an example of a suitable getter material. It should be noted, however, that the disclosed method is not limited to zirconium-vanadium-iron alloys, and examples of use of the method with other types of getter materials will be provided in more detail below. In addition, while a zirconium-vanadium-iron alloy will be used as a primary example of a getter material that can be highly charged using the method of the present invention, it should be noted that alloys containing zirconium, vanadiurm, and iron in proportions other than the specified weight compositions for St707™ can be used with the method of the present invention as well. Furthermore, getter materials containing titanium, aluminum, manganese, and other metals can also be used with the method of the present invention.

Figure 2:
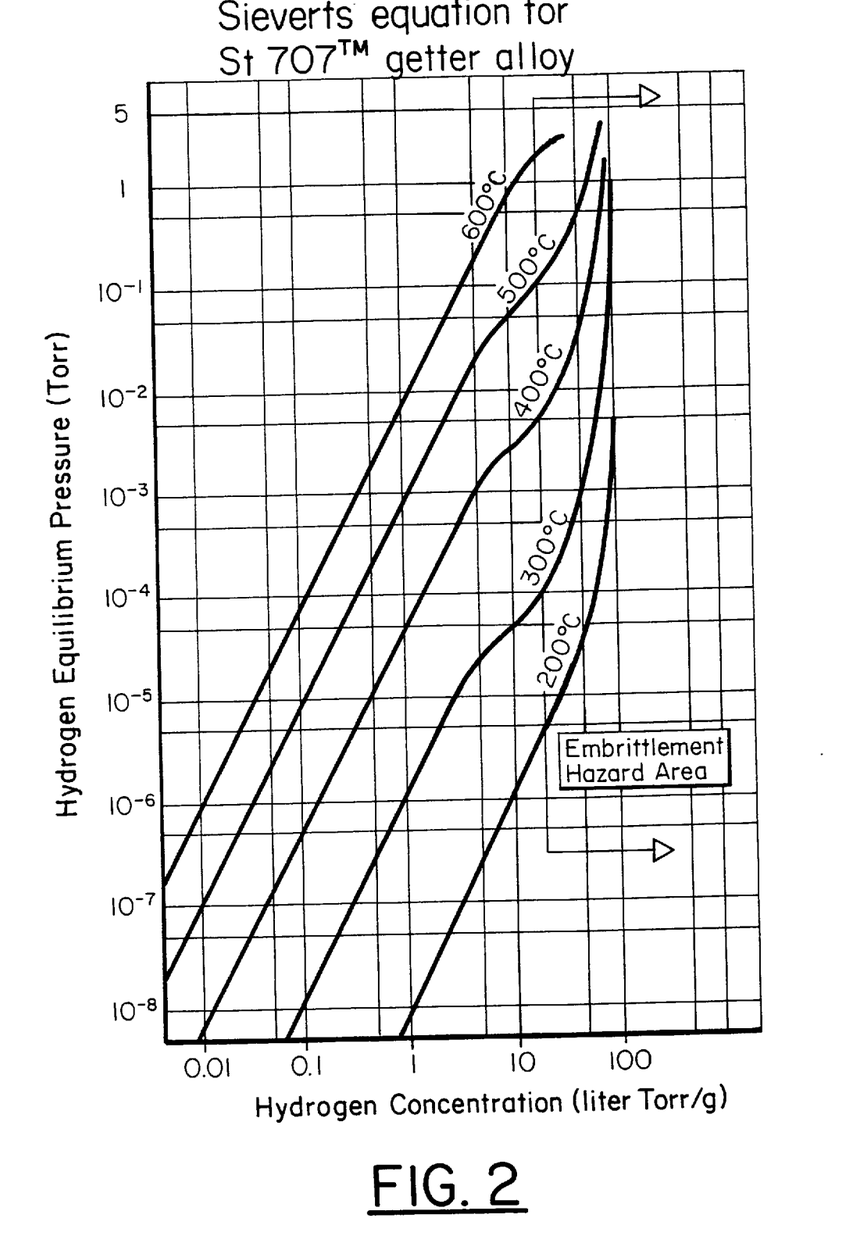
FIG. 2 is a chart of the hydrogen equilibrium pressure over a St707™ alloy comprising zirconium, vanadium, and iron.

In conventional and well known hydrogen getter charging techniques, a reversible hydrogen getter material, such as, for example, St707™ alloy manufactured by SAES Getters, S.p.A. of Milano, Italy, is placed in an enclosed chamber and activated in the activation step 11 by heating the getter material for a short time (e.g., $10^{-6}$ torr, 800° C., ten minutes) to eliminate a protective oxide film on the getter material's surface. Lower temperatures for longer periods of time may also be used to activate the hydrogen getter material. The activated getter material is then overcharged (i.e., charged to over twenty torr-liters/gram) in the overcharging step 12 by exposing the hydrogen getter material to hydrogen that is injected into or otherwise pumped into the vacuum chamber in which the activated getter material is placed. The getter material absorbs the hydrogen in an exothermic reaction. During the overcharging step 12, the zirconium-vanadium-iron alloy exothermically absorbs its full charge of hydrogen at room temperature (which is approximately twenty-five degrees celsius (25° C.)), and it is not unusual for the zirconium-vanadium-iron alloy to generate heat during the exothermic process approaching temperatures of 350° C. Charging of the St707™ alloy beyond approximately twenty torr-liters/gram is generally not recommended by SAES Getters, since the behavior of an St707™ alloy will deviate from its normal theoretical behavior that is approximated by the Sieverts' equation for the St707™ alloy which is as follows:

$$\log P = 4.8 + 2 \log Q - \frac{6116}{T} \quad (4)$$

as shown in FIG. 2, where P equals the $H_2$ equilibrium pressure in torr, Q equals the $H_2$ concentration within the alloy (usually 0.1 to 10 torr-liters/gram) and T equals the temperature [in degrees Kelvin (°K)]. More specifically, when zirconium-vanadium-iron alloys are overcharged with large amounts of hydrogen, the zirconium-vanadium-iron alloys exhibit an inordinately high residual or base pressure of hydrogen at low temperatures (i.e., temperatures near approximately 25° C.). A sample of zirconiuim-vanadiuim-iron alloy can be overcharged with hydrogen during the overcharging step 12 by exposing the sample of zirconium-vanadium-iron alloy to large amounts hydrogen in an enclosed volume for a minimum of ten minutes while allowing the sample of zirconium-vanadium-iron alloy to undergo an exothermic reaction in which heat energy is given off or emitted by the sample of zirconiuim-vanadium-iron alloy. For example, in a one liter volume enclosed chamber, a one gram sample of zirconium-vanadium-iron alloy is preferably exposed to at least one-hundred and fifty (150) torr-liters of hydrogen that is injected into the chamber after the activation step 11 is complete. The sample of zirconium-vanadium-iron alloy will overcharge itself by absorbing most, if not all, of the hydrogen that is injected into the chamber.

Figure 3:
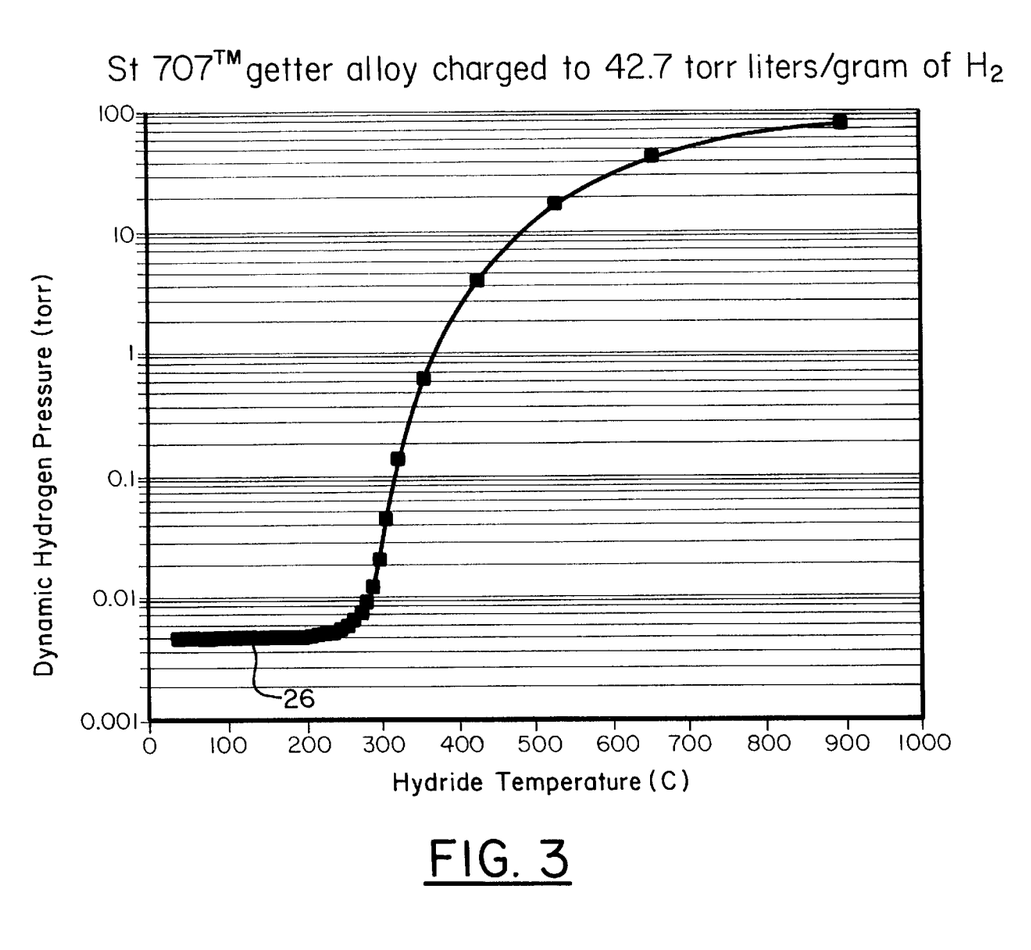
FIG. 3 is a graph of the hydrogen pressure versus temperature for a St707™ alloy overcharged to approximately 42.7 torr-liters/gram of hydrogen in a one liter volume using conventional charging techniques.

For an example of the high residual or base hydrogen pressure problems of an overcharged zirconium-vanadium-iron alloy resulting after the overcharging step 12, and now referring to FIG. 3, a sample of St707™ alloy overcharged with 42.7 torr-liters/gram of hydrogen in a one liter volume by conventional techniques has a high residual base hydrogen pressure 26 of approximately $4\times10^{-3}$ torr between 280° C. and room temperature. At an overcharge level of 42.7 torr-liters/gram, the Sieverts' equation erroneously predicts a residual base hydrogen pressure for the St707™ alloy in the $10^{-11}$ torr range at room temperature.

Despite the ability to overcharge a zirconium-vanadium-iron alloy such that hydrogen concentrations within the zirconium-vanadium-iron alloy above approximately ten to twenty torr-liters/gram can be obtained, after the overcharging step 12, the high (i.e., higher than $10^{-3}$ torr) residual hydrogen base pressure 26 at low temperatures (i.e., room temperature) exhibited by the sample of the overcharged zirconium-vanadium-iron alloy shown in FIG. 3 is well above the maximum allowed in many applications such as, for example, the $10^{-4}$ torr needed in vacuum insulation applications disclosed in U.S. Pat. No. 5,318,108 issued to Benson et al. The high hydrogen base pressure of approximately $10^{-3}$ torr between room temperature and 280° C. for such overcharged getters reduces the usefulness of the such overcharged getter material in many applications.

The high residual $H_2$ pressure at low temperatures exhibited by an overcharged St707™ alloy or other zirconium-vanadiun-iron alloy after the overcharging step 12 can be removed according to this invention by performing a low-temperature vacuum bake-out 14 of the alloy within the chamber to form a highly charged zirconium-vanadium-alloy. The vacuum bake-out step 14 with a sample of overcharged getter material is preferably performed by heating the sample of overcharged getter material at a temperature between 80° C. and 250° C. (optimally between 120° C. and 170° C.) for approximately fifteen seconds to ten minutes (optimally one to five minutes) while evacuating the chamber of gases to reduce the pressure within the chamber. The vacuum bake-out step 14 causes reduction of the base hydrogen pressure of the sample of getter material. The vacuum bake-out step 14 also removes some of the total hydrogen content of the alloy, but a high hydrogen charge is retained within the alloy, and the resulting alloy will have a low residual base pressure below $10^{-4}$ torr.

Figure 4:
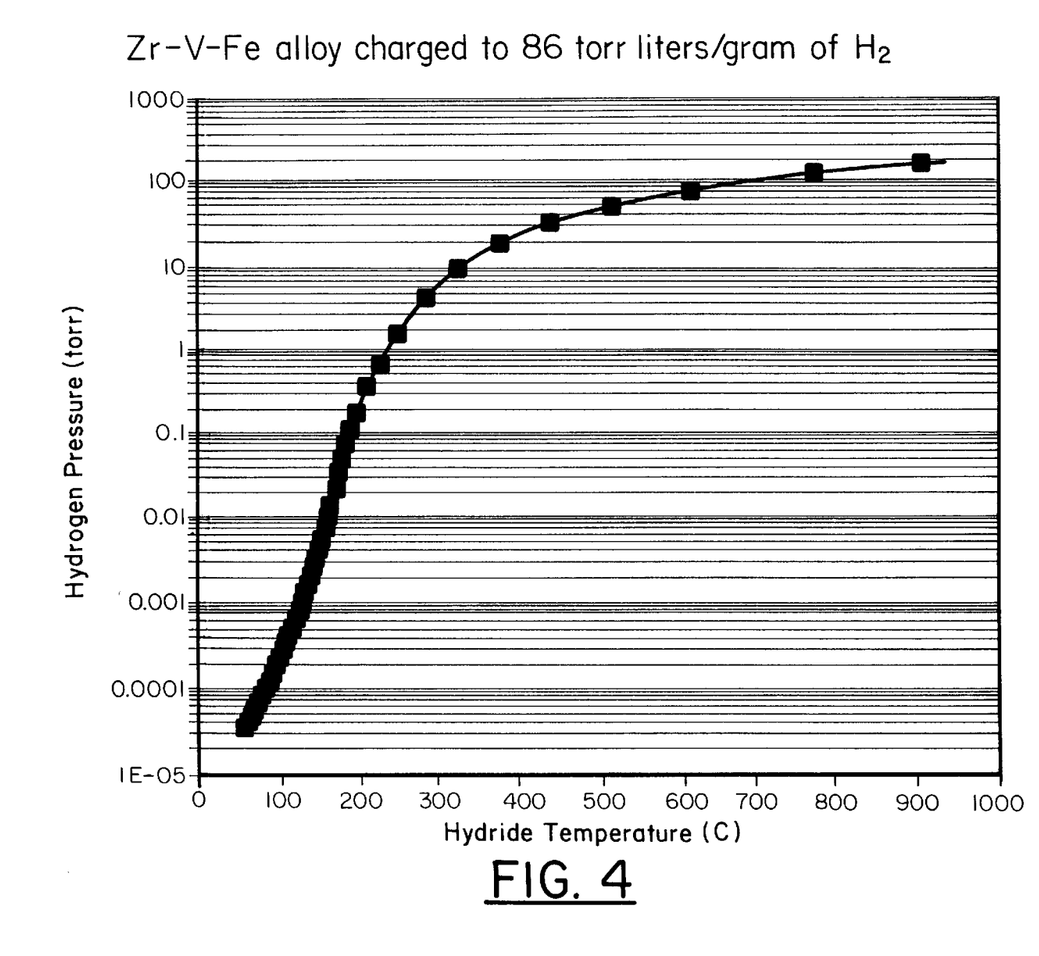
FIG. 4 is a graph of the hydrogen pressure versus temperature in a one liter volume for a St707™ alloy highly charged with hydrogen using the method of FIG. 1.

Studies indicate that the higher than predicted residual base pressure of the overcharged sample of St707™ alloy, which comprises of zirconium (Zr), vanadium (V), and iron (Fe), may be due to excessive $H_2$ concentrations and the formation of weakly bound hydrogen in $VH_x$ of the sample of St707™ alloy when x is greater than 0.5. Therefore, it is believed that this method reduces the residual base pressure of the overcharged St707™ alloy and other zirconium-vanadium-iron alloys after the overcharging step 12 in the vacuum bake out step 14 by desorbing the low binding energy sites of the $VH_x$ which contribute to the relatively high hydrogen equilibrium pressure at low temperatures. One way to desorb the low energy binding sites of the $VH_x$ in a sample of the zirconium-vanadium-iron alloy is too subject the sample of zirconium-vanadium-iron alloy to the vacuum bake out step 14, as will be discussed in more detail below. For example, a St707™ alloy initially overcharged to approximately 100 torr-liters/gram of hydrogen was subjected to a low temperature vacuum bake-out of approximately 170° C. for approximately five minutes. As shown in FIG. 4, after the vacuum bake-out step 14 was complete, the St707™ alloy remained highly charged at approximately 86 torr-liters/gram of hydrogen and resorbs hydrogen to a base pressure below $10^{-4}$ torr at low temperatures in a one liter volume chamber.

As shown by the examples provided above, therefore, in addition to the block diagram shown in FIG. 1, the method of the present invention involves, first, activating a sample of reversible hydrogen getter material to eliminate the oxide film on the hydrogen getter material's outside surface. Activation of the sample of reversible hydrogen getter material is preferably obtained by subjecting the sample of getter material to heat at low pressure for a period of time. For example, the sample of reversible hydrogen getter material can be heated to 800° C. for ten minutes at a pressure of $10^{-6}$ torr. Heating the sample at other temperatures for different lengths of time and at different pressures will also work to activate the sample. Second, the overcharging of the sample of reversible hydrogen getter material is obtained by exposing the sample to large amounts of hydrogen which is absorbed by the sample to provide a high concentration of hydrogen within the getter material If the sample of reversible hydrogen getter material is positioned within an enclosed chamber, the hydrogen can be injected into the chamber to expose the sample of reversible hydrogen getter material to the hydrogen. Third, the vacuum bake-out of the sample of reversible hydrogen getter material to reduce the residual base pressure of the getter material at low temperatures is obtained by heating the overcharged sample to preferably between 120° C. to 170° C. for one to five minutes (although other temperature ranges and time durations are also possible). While the St707™ alloy has a recommended maximum hydrogen capacity of twenty torr-liters/gram, the overcharge/bake-out method of the present invention has been successfully used to highly charge St707™ alloys to hydrogen concentrations of one-hundred and fifteen (115) torr-liters/gram This method eliminates the high residual pressure of hydrogen observed at low temperatures when a zirconium-vanadium-iron alloy and getter materials comprising other elements such as, for example, titanium, are charged to high capacities. Nearly complete desorption of hydrogen from $10^{-5}$ torr to $10^2$ torr from heated canisters positioned in a one liter enclosed volume and containing a zirconium-vanadium-iron alloy is typically very fast, generally requiring only three to four minutes. Resorption of hydrogen by the cooled zirconium-vanadium-iron alloy from $10^2$ torr to $10^{-5}$ torr typically takes approximately twenty-five minutes or less, while resorption from $10^2$ torr to below $10^{-3}$ torr typically requires significantly less time.

Specific examples of getter materials highly charged by the method of the present invention will now be provided to further illustrate the method of the present invention. Example one will provide an illustration of the second embodiment of the invention of the present invention.

EXAMPLE 1: ZIRCONUIM-VANADIUM-IRON ALLOY

Figure 5:
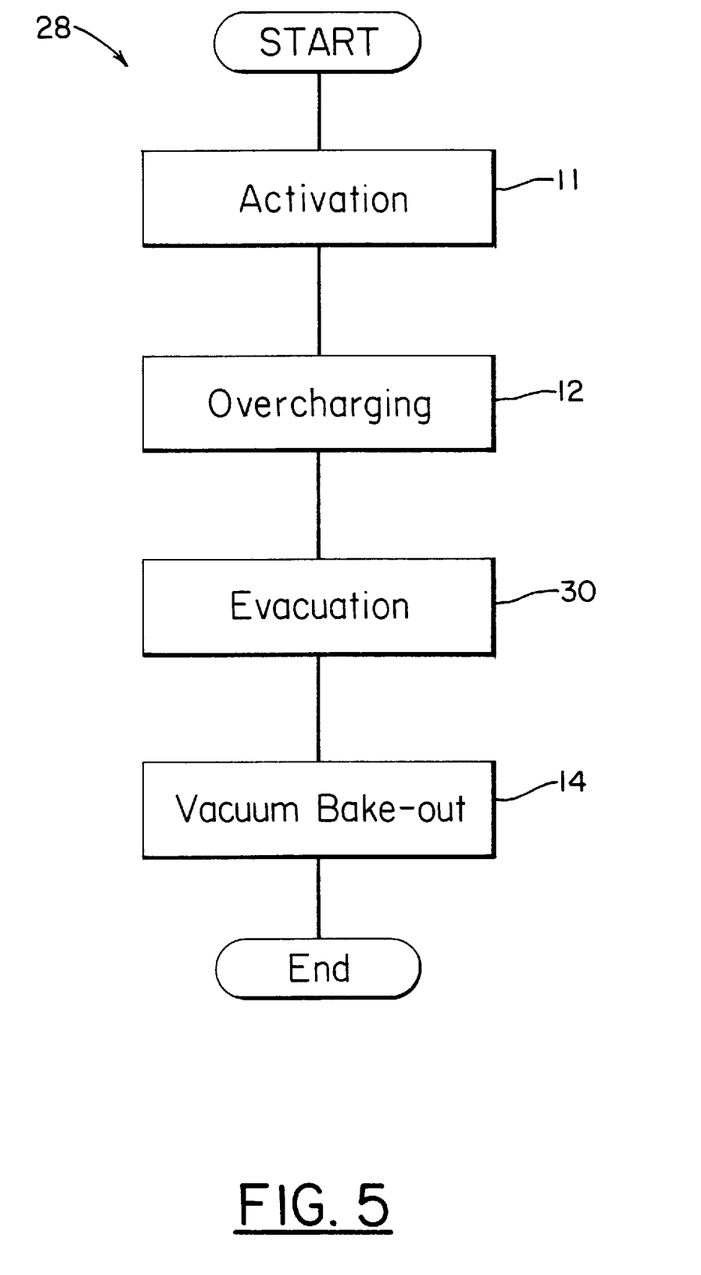
FIG. 5 is a block diagram illustrating a second embodiment of the method of FIG. 1.

A second embodiment 28 of the method of the present invention is illustrated and described with reference to FIG. 5. A 2.17 gram sample of St707™ alloy contained in a canister within a one liter volume enclosed chamber is activated in the activation step 11 to remove its protective oxide layer and then overcharged with hydrogen in the overcharging step 12 using conventional charging techniques wherein the pressure within the chamber was initially $10^{-\neq}$ torr. More specifically, after the sample of zirconiun-vanadiuim-iron alloy is activated by heating it at 800° C. for ten minutes in the evacuated chamber, hydrogen is injected into the evacuated chamber, and the sample of zirconium-vanadium-iron alloy is exposed to approximately 323 torr-liters of hydrogen for approximately ten minutes while the sample of zirconium-vanadium-iron alloy undergoes an exothermic reaction in which the sample of zirconiumvanadium-iron alloy gives off heat and reaches temperatures approaching 350° C. As a result of the exothermic absorption of hydrogen by the sample of zirconium-vanadium-iron alloy, the sample of zirconium-vanadium-iron alloy is overcharged to approximately 139 torr-liters/gram of hydrogen, and the pressure within the chamber from excess hydrogen that is not absorbed by the getter material is approximately twenty-two torr. After the activation step 11 and the overcharging step 12 are complete as described above, and the sample of zirconium-vanadium-iron alloy is allowed to cool to room temperature, the excess unabsorbed hydrogen gas within the chamber is preferably evacuated during an evacuation step 30, which removes the excess hydrogen gas from the chamber. During the evacuation step 30, the pressure within the chamber should be reduced to some appropriate vacuum that is sufficient to eliminate most of the excess hydrogen, such as, approximately $10^{-3}$ torr. After evacuating the excess hydrogen from the chamber as described above, the pressure within the chamber will rise to approximately one torr because some of hydrogen will be released by the sample of getter material. After the evacuation step 30 is complete, the sample of zirconium-vanadium-iron alloy is subjected to the vacuum bake-out step 14 according to this invention by heating the sample of zirconium-vanadium-iron alloy to approximately 150° C. for approximately one to five minutes while the chamber is evacuated again to remove hydrogen gas that is released by the sample of zirconium-vanadium-iron alloy. During the vacuum bake-out step 14, the pressure within the chamber is preferably reduced to approximately $10^{-6}$ torr, but not all of the hydrogen gas is released. At the end of the vacuum bake-out step 14, the sample of zirconium-vanadium-iron alloy will be highly charged to between ninety (90) and one-hundred and fifteen (115) torr-liters/gram and will have a residual hydrogen base pressure below approximately $10^{-4}$ torr at low temperatures (i.e., at room temperature) in the one liter volume chamber. When the sample of zirconium-vanadium-iron alloy is heated to approximately 850° C., the sample of zirconium-vanadium-iron alloy will release approximately eighty (80) to one-hundred (100) torr-liters/gram of hydrogen.

With regard to the use of getter materials in a vacuum insulation application, such as the type disclosed in U.S. Pat. No. 5,318,108 issued to Benson et al., if only ten torr is needed for maximum conductance in a vacuum insulation with a volume less than thirty liters, reasonable reversible getter quantities and reasonable electric power required to heat the getter material to release sufficient hydrogen appear possible. For example, only 2.17 grams of St707™ alloy and thirty-two watts are required to desorb ninety-four percent (94%) of an approximately 94 torr-liters/gram hydrogen charge and achieve 7.5 torr in a 25.6 liter volume.

EXAMPLE 2: TITANIUM

Figure 6:
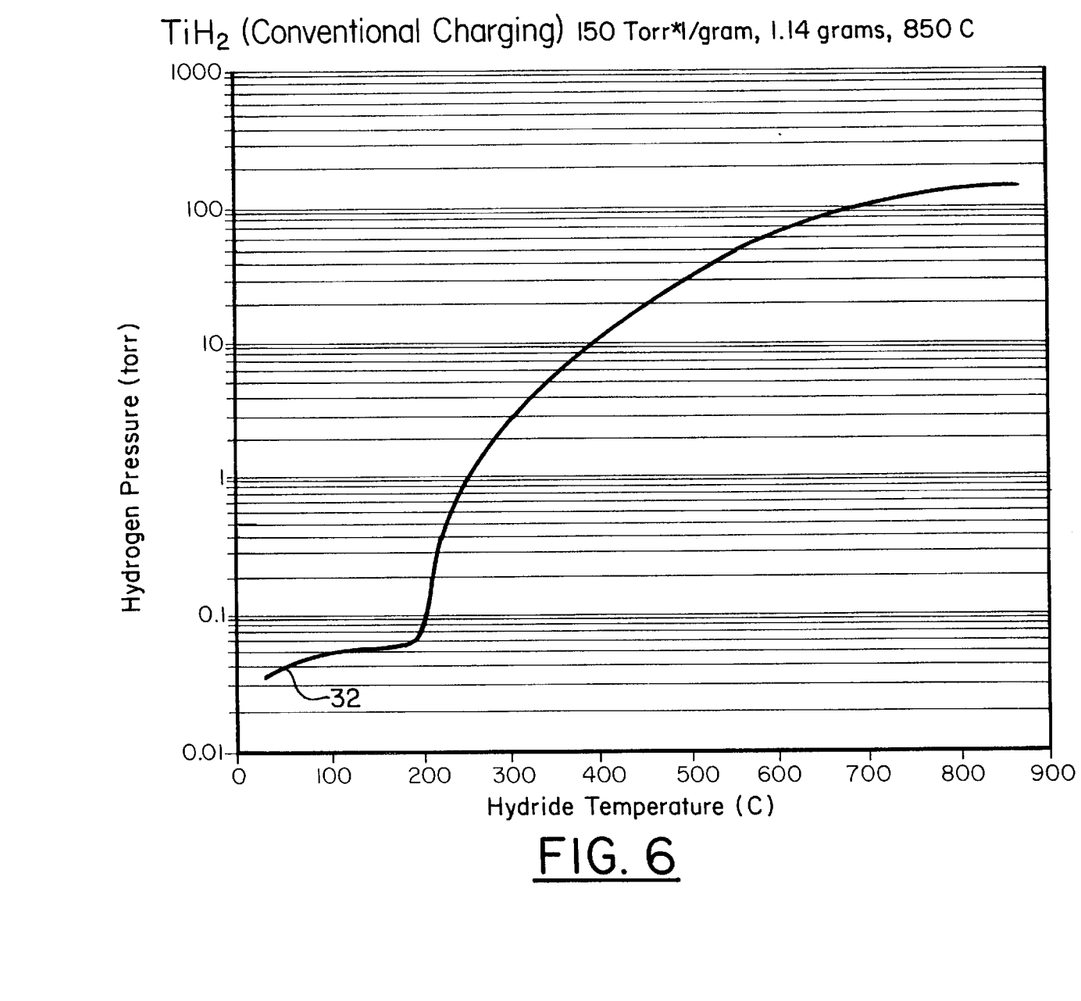
FIG. 6 is a graph of the hydrogen pressure versus temperature in a one liter volume for a sample of $TiH_2$ getter material overcharged with hydrogen using conventional charging techniques.

In addition to zirconium-vanadium-iron alloys, other getter materials such as titanium (Ti) suffer similar problems when overcharged to high concentrations of hydrogen. For example, a 1.14 gram sample of $TiH_2$ overcharged with conventional techniques in a one liter volume to a hydrogen concentration of 150 torr-liters/gram is shown in FIG. 6. At 850° C., the $TiH_2$ getter material will desorb approximately 114 torr-liters/gram of hydrogen and, when cooled to room temperature, will resorb hydrogen to a room temperature base pressure 32 of approximately 0.030 torr in the one liter volume chamber.

Figure 7:
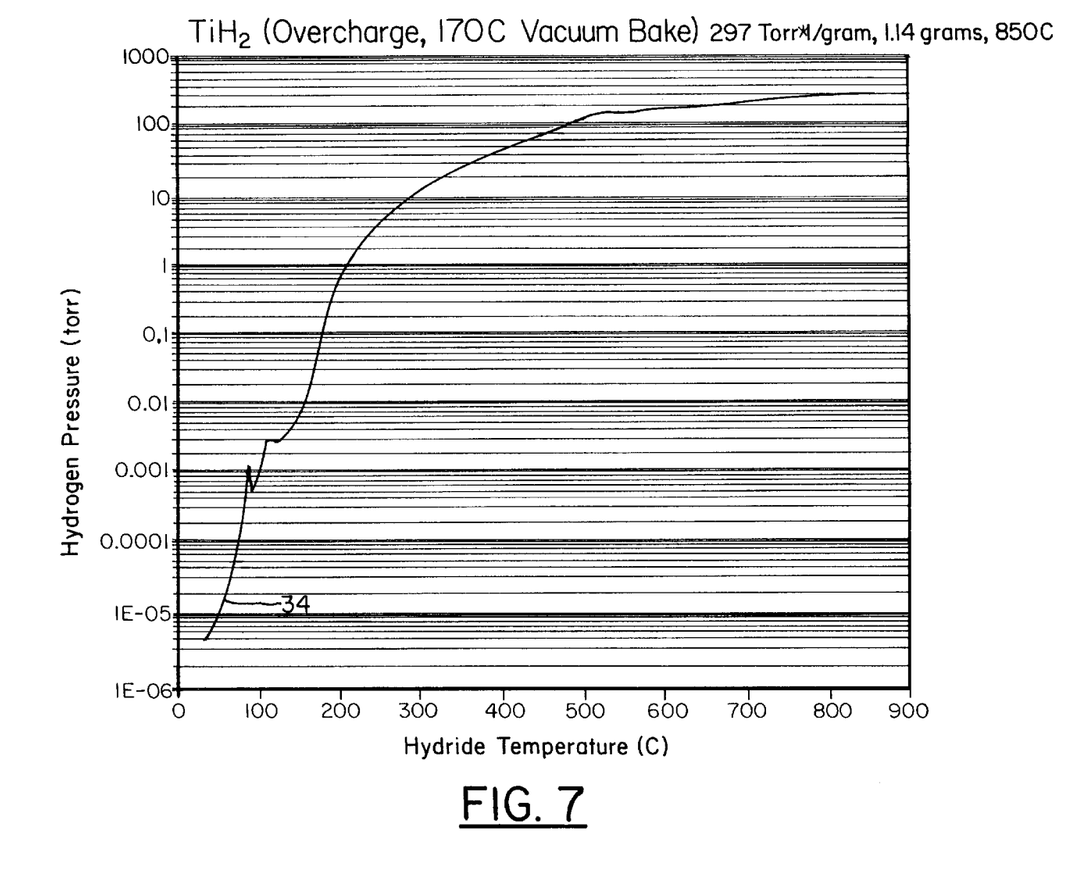
FIG. 7 is a graph of the hydrogen pressure versus temperature in a one liter volume for a sample of $TiH_2$ getter material highly charged with hydrogen using the method of FIG. 5.

Applying the overcharging/vacuum bake-out method 10 of the present invention to the 1.14 gram sample of $TiH_2$ reversible hydrogen getter material in an enclosed one liter volume chamber, the sample of $TiH_2$ getter material will overcharge to approximately 297 torr-liters/gram, as shown in FIG. 7. The sample of $TiH_2$ getter material is activated in the activation step 11 by heating the sample at 850° C. for ten minutes. After the sample is activated, hydrogen is injected into the enclosed chamber and the sample of $TiH_2$ getter material is exposed to approximately 495 torr-liters of hydrogen for approximately ten minutes. In contrast to the zirconium-vanadium-iron alloy discussed above in the first example, which exothermically absorbs its fill hydrogen charge at room temperature during the charging process, charging of $TiH_2$ is an endothermic process such that heat above approximately 300° C. must be applied to the sample of $TiH_2$ while the sample of $TiH_2$ getter material is exposed to hydrogen for approximately ten minutes. As a result of the overcharging of the sample of $TiH_2$ getter material in the overcharging step 12, the sample is overcharged to approximately 310 torr-liters/gram of hydrogen and has a residual base pressure of 142 torr. The excess unabsorbed hydrogen within the chamber is evacuated or pumped out of the chamber during the evacuation step 30 as described above to reduce the pressure within the chamber to approximately $10^{-3}$ torr. The pressure within the chamber will rise to approximately one-half torr after the evacuation step 30, however, as a result of the release of some hydrogen from the sample of $TiH_2$ getter material. After the evacuation step 30 is complete, the sample of $TiH_2$ reversible hydrogen getter material is subjected to the vacuum bake-out step 14 according to this invention by heating the sample to approximately 170° C. for approximately five minutes. During the vacuum bake-out step 14, the chamber is preferably evacuated to removed hydrogen released by the sample of $TiH_2$ reversible hydrogen getter material and the pressure within the one liter volume chamber is preferably reduced to approximately $10^{-6}$ torr.

Figure 8:
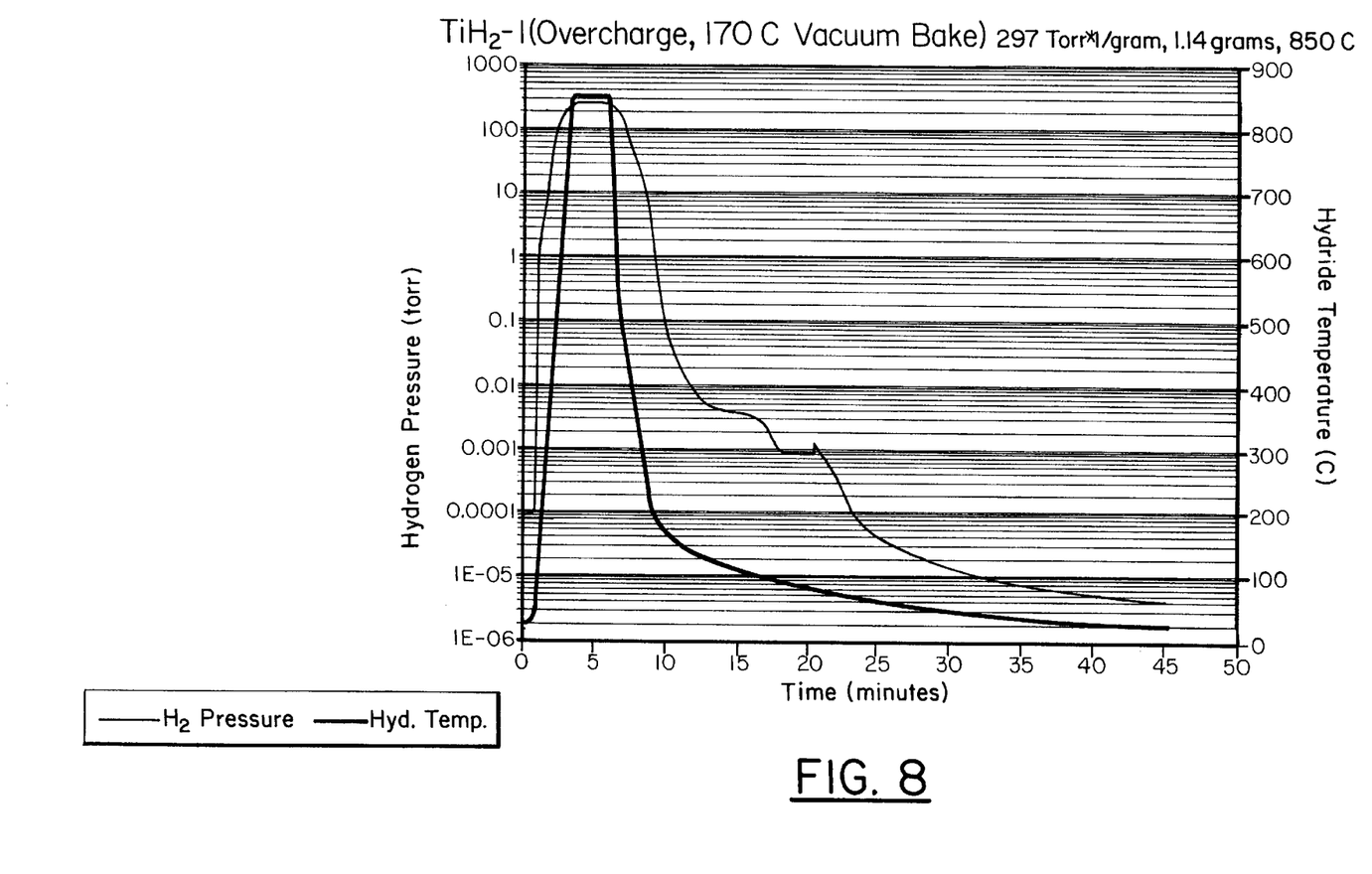
FIG. 8 is a graph of the hydrogen pressure and temperature as a function of time of the sample of $TiH_2$ getter material of FIG. 7.
Figure 9:
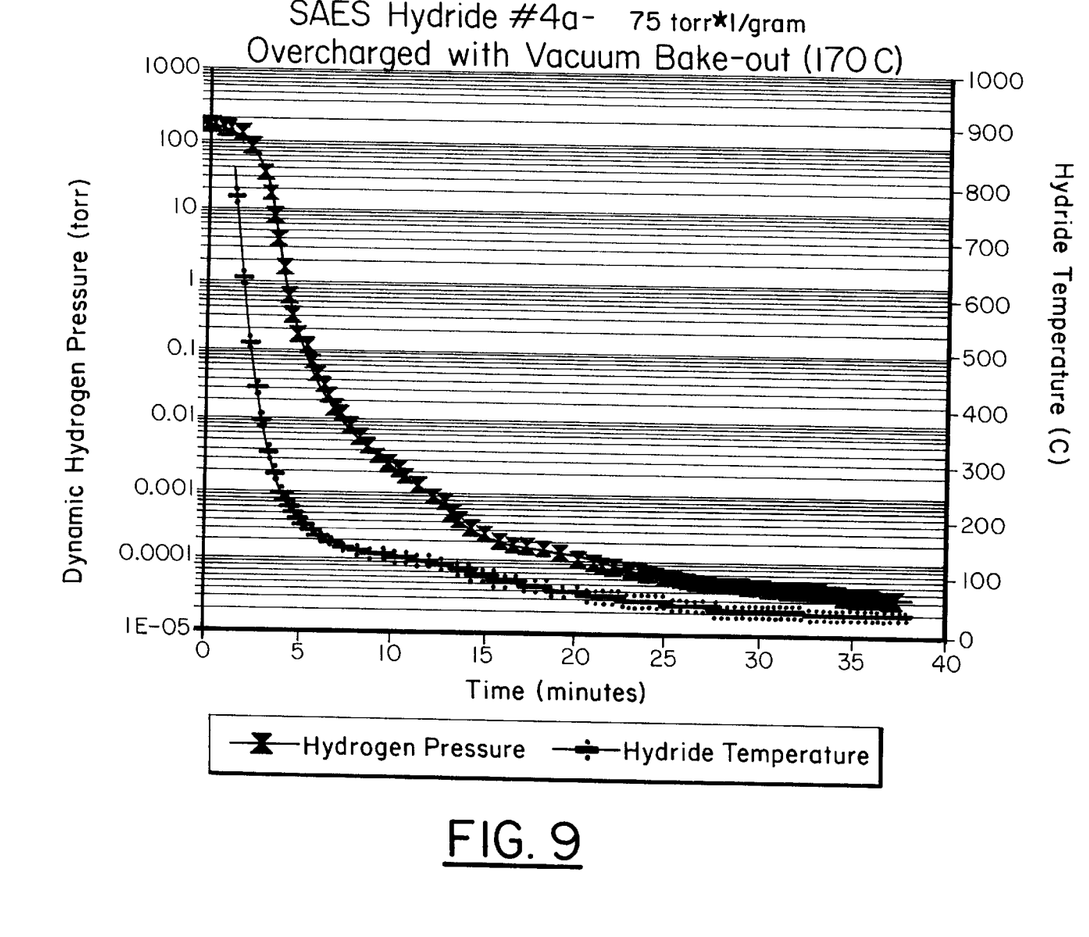
FIG. 9 is a graph of the hydrogen pressure and temperature as a function of time for a sample of zirconium-vanadium-iron alloy.

After the vacuum bake-out step 14, the sample of $TiH_2$ hydrogen getter material is highly charged to approximately 297 torr-liters/gram of hydrogen and has a residual hydrogen base pressure of approximately $10^{-6}$ torr at room temperature. When heated to approximately 850° C., the sample of $TiH_2$ hydrogen getter material highly charged according to this invention as described above will desorb approximately 258 torr-liters/gram of hydrogen and, when cooled to room temperature, will resorb hydrogen to a room temperature base pressure 34 of approximately $10^{-6}$ torr in a one liter volume chamber. The low base pressure 34 of the sample of $TiH_2$ getter material indicates that $TiH_2$ may have simr (possibly better) permanent gettering power for outgassing species ($O_2$, $H_2O$, etc.) as the St707™ alloy discussed above. Testing has indicated that $TiH_2$ can be highly charged according to this invention to at least three-hundred (300) torr-liters/gram of hydrogen while maintaining a low (i.e., less than or equal to $10^{-5}$ torr) base pressure at room temperature. The hydrogen pressure and temperature as a function of time in a one liter volume for the highly charged sample of $TiH_2$ getter material is shown in FIG. 8, which illustrates that the sample of $TiH_2$ can resorb hydrogen to reduce the pressure in a one liter volume from approximately 297 torr down to 0.001 torr in approximately fourteen minutes. For comparison purposes, the hydrogen pressure and temperature as functions of time for a sample of zirconium-vanadium-iron alloy highly charged to seventy-five torr-liters/gram is shown in FIG. 9, which illustrates that the sample of zirconium-vanadium-iron alloy highly charged according to this invention can resorb hydrogen to reduce the pressure in a one liter volume chamber from approximately 140 torr down to 0.001 torr in approximately ten minutes. FIGS. 8 and 9 suggest that the sample of $TiH_2$ highly charged according to this invention has a slightly better (approximately twenty-one torr per minute) hydrogen resorption rate than the sample of St707™ alloy (approximately fourteen torr per minute).

The foregoing description is considered as illustrative only of the principles of the invention. Furthermore, since numerous modifications and changes will readily occur to those skilled in the art, it is not desired to limit the invention to the exact construction and process shown and described above. Accordingly, all suitable modifications and equivalents may be resorted to falling within the scope of the invention as defined by the claims which follow.

We claim:

1. A method for charging a sample of hydrogen getter material, comprising the steps of:
    activating the sample of hydrogen getter material;
    after said step of activating said sample of hydrogen getter material, exposing said sample of hydrogen getter material to hydrogen such that hydrogen is absorbed into said sample of hydrogen getter material and such that said sample of hydrogen getter material is charged to more than twenty torr-liters per gram of hydrogen; and
    after said step of exposing said sample of hydrogen getter material to hydrogen, vacuum baking said sample of hydrogen getter material.

2. The method of claim 1, wherein said sample of hydrogen getter material comprises an alloy of zirconium, vanadium, and iron.

3. The method of claim 2, wherein said sample of hydrogen getter material comprises an alloy of zirconium, vanadium, and iron at a weight composition of approximately 70%, 24.6%, and 5.4%, respectfully.

4. The method of claim 2, wherein said sample of hydrogen getter material comprises an St707™ alloy.

5. The method of claim 1, wherein said sample of hydrogen getter material includes titanium.

6. The method of claim 5, wherein during said step of exposing said sample of hydrogen getter material to hydrogen, heat is applied to said sample of hydrogen getter material.

7. The method of claim 1, wherein said sample of hydrogen getter material comprises a reversible hydrogen getter material.

8. The method of claim 1, wherein during said vacuum baking of said sample of hydrogen getter material, heat is applied to said sample of hydrogen getter material in a range between a first temperature and a second temperature for a period of time.

9. The method of claim 1, wherein said first temperature is approximately 80° C. and said second temperature is approximately 250° C.

10. The method of claim 9, wherein said period of time is longer than approximately fifteen seconds.

11. The method of claim 10, wherein said period of time is less than approximately ten minutes.

12. The method of claim 1, wherein during said step of activating said sample of hydrogen getter material, said sample of hydrogen getter material is heated for a period of time.

13. The method of claim 12, wherein during said step of activating said sample of hydrogen getter material, said hydrogen getter material is heated to approximately 800° C.

14. The method of claim 13, wherein during said step of activating said sample of hydrogen getter material, said sample of hydrogen getter material is heated to approximately 800° C. for approximately ten minutes.

15. The method of claim 1, wherein said sample of hydrogen getter material is exposed to hydrogen for approximately ten minutes.

16. The method of claim 1, wherein said sample of hydrogen getter material is evaporable.

17. The method of claim 1, wherein said sample of hydrogen getter material is non-evaporable.

18. The method of claim 1, wherein after the step of exposing said sample of hydrogen getter material to hydrogen such that hydrogen is absorbed into said sample of hydrogen getter material, said sample of hydrogen getter material is cooled.

19. The method of claim 18, wherein said sample of hydrogen getter material is cooled to room temperature.

20. The method of claim 1, wherein all of the steps take place in an enclosed vacuum chamber.

21. A method of charging a sample of hydrogen getter material, comprising the steps of:
    placing said sample of hydrogen getter material into a vacuum chamber;
    evacuating said vacuum chamber to a first pressure while leaving said sample of hydrogen getter material within said vacuum chamber;
    activating said sample of hydrogen getter material;
    injecting hydrogen into said vacuum chamber so that said sample of hydrogen getter material is exposed to said hydrogen and such that said sample of hydrogen getter material absorbs hydrogen to a charge level of more than twenty torr-liters per gram of hydrogen;
    evacuating said vacuum chamber to a second pressure while leaving said sample of hydrogen getter material within said vacuum chamber; and
    after said step of evacuating said vacuum chamber to a second pressure, vacuum baking said sample of hydrogen getter material.

22. The method of claim 21, wherein said first pressure is equal to said second pressure.

23. The method of claim 21, wherein said first pressure equals approximately $10^{-6}$ torr.

24. The method of claim 21, wherein said sample of hydrogen getter material is allowed to absorb at least some of the hydrogen injected into said vacuum chamber before said vacuum chamber is evacuated to said second pressure.

25. The method of claim 21, wherein said sample of hydrogen getter material comprises zirconium, vanadium, and iron.

26. The method of claim 25, wherein said sample of hydrogen getter material comprises zirconium, vanadium, and iron at a weight composition of approximately 70%, 24.6%, and 5.4%, respectfully.

27. The method of claim 26, wherein said sample of hydrogen getter material comprises an St707™ alloy.

28. The method of claim 21, wherein said sample of hydrogen getter material includes titanium.

29. The method of claim 21, wherein said sample of hydrogen getter material is comprises a reversible hydrogen getter material.

30. The method of claim 21, wherein said sample of hydrogen getter material is evaporable.

31. The method of claim 22, wherein said sample of hydrogen getter material is non-evaporable.

32. The method of claim 21, wherein after the step of injecting hydrogen into said chamber so that said sample of hydrogen getter material is exposed to hydrogen, said sample of hydrogen getter material is cooled.

33. The method of claim 32, wherein said sample of hydrogen getter material is cooled to room temperature.

34. The method of claim 21, including the step of applying heat to said sample of hydrogen getter material in a range between a first temperature and a second temperature for a period of time during said vacuum baking of said sample of hydrogen getter material.

35. The method of claim 34, wherein said second temperature is approximately 250 degrees Celsius.

36. The method of claim 35, wherein said first temperature is approximately eighty degrees Celsius.

37. The method of claim 34, wherein said period of time is shorter than approximately ten minutes.

38. The method of claim 37, wherein said period of time is longer than approximately fifteen seconds.

39. A sample of hydrogen getter material having a base pressure less than or equal to $10^{-4}$ torr at room temperature and a charge level greater than twenty torr-liters per gram of hydrogen, fabricated by a process comprising the steps of:

exposing an activated sample of hydrogen getter material to hydrogen such that hydrogen is absorbed into said activated sample of hydrogen getter material to a charge level of more than twenty torr-liters per gram; and after said step of exposing said activated sample of hydrogen getter material to hydrogen, vacuum baking said sample of hydrogen getter material.

40. The getter material formed by the process of claim 39, wherein heat is applied to said sample of hydrogen getter material during said step of vacuum baking said sample of hydrogen getter material for a time period longer than approximately fifteen seconds.

41. The getter material formed by the process of claim 40, wherein heat is applied to said sample of hydrogen getter material during said step of vacuum baking said sample of hydrogen getter material for a time period shorter than approximately ten minutes.

42. The getter material formed by the process of claim 39, wherein heat in a range between eighty and 250 degrees Celsius is applied to said sample of hydrogen getter material during said step of vacuum baking said sample of hydrogen getter material.

43. A method for creating a sample of hydrogen getter material having a base pressure less than or equal to $10^{-4}$ torr at room temperature and a charge level of more than twenty torr-liters per gram of hydrogen, comprising the steps of:

exposing an activated sample of hydrogen getter material to hydrogen such that hydrogen is absorbed into said activated sample of hydrogen getter material to a charge level of more than twenty torr-liters per gram; and after said step of exposing said sample of hydrogen getter material to hydrogen, vacuum baking said sample of hydrogen getter material.

44. The method of claim 43, wherein heat is applied to said sample of hydrogen getter material during said step of vacuum baking said sample of hydrogen getter material for a time period longer than approximately fifteen seconds.

45. The method of claim 44, wherein heat is applied to said sample of hydrogen getter material during said step of vacuum baking said sample of hydrogen getter material for a time period shorter than approximately ten minutes.

46. The method of claim 45, wherein heat in a range between eighty and 250 degrees Celsius is applied to said sample of hydrogen getter material during said step of vacuum baking said sample of hydrogen getter material.

* * * * *